United States Patent [19]

Desoomer et al.

[11] Patent Number: 5,804,245

[45] Date of Patent: Sep. 8, 1998

[54] METHOD FOR PRODUCING A FROZEN RAW FISH PREPARATION

[76] Inventors: Jean-Paul Desoomer, 8, de Ruscame, 62126 Pernes Les Boulogne, France; Pierre-Francois Beirnaert, 11, sentier du Denacre, 62126 Wimille, France; Benoît Germe, ferme du Rieux, route de Paris, 62360 Hesdin L'Abbe, France

[21] Appl. No.: 592,805

[22] Filed: Jan. 26, 1996

[30] Foreign Application Priority Data

Feb. 1, 1995 [FR] France .................................. 95 01343

[51] Int. Cl.⁶ ...................................................... A23L 1/325
[52] U.S. Cl. ........................ 426/643; 426/513; 426/518; 426/524
[58] Field of Search .................................. 426/643, 513, 426/524, 518

[56] References Cited

U.S. PATENT DOCUMENTS 5,188,854  2/1993  Hartman et al. .................... 426/272

FOREIGN PATENT DOCUMENTS

| 8942882 | 4/1983 | Australia . |
| 0328881 | 8/1989 | European Pat. Off. . |
| 0358791 | 3/1990 | European Pat. Off. . |
| 2059337 | 5/1971 | France . |
| 2137873 | 12/1972 | France . |
| 2559649 | 8/1985 | France . |
| 2683124 | 5/1993 | France . |
| 3-91440 | 4/1991 | Japan . |

*Primary Examiner*—Arthur L. Corbin
*Attorney, Agent, or Firm*—Ladas & Parry

[57] ABSTRACT

A raw deep-frozen fish preparation is composed of 90 to 75% of coarse pieces of fish, containing the connective tissue, and of 10 to 25% of a fish paste, coated around the coarse pieces, said paste consisting of finely ground and minced fish flesh capable of forming a binder. The preparation is produced from blocks of frozen or deep-frozen fish flesh by the following steps:

a) partial defrosting of the fish flesh in order to reach a temperature of −10° C. to −2° C., b) finely mincing 10 to 25% of the thus partially defrosted flesh, optionally adding a small quantity of salt and/or proteinic substances, until a fine paste is obtained which is sticky to the touch, c) mincing coarsely the rest of the partially defrosted fish flesh until coarse pieces are obtained, d) incorporating the coarse pieces with the paste until a homogeneous mixture is obtained, and then e) molding the homogeneous mixture and deep-freezing.

6 Claims, No Drawings

METHOD FOR PRODUCING A FROZEN RAW FISH PREPARATION

SUMMARY OF THE INVENTION

The present invention relates to a preparation of minced raw fish deep-frozen state, the preparation being in any suitable form and showing sufficient cohesion not only to be deep-fried but also to be fried in a pan in the same way as a minced steak prepared from beef meat, or to be baked, steamed, or even cooked in a vacuum bag.

BACKGROUND OF THE INVENTION

There are, on the market, two main types of fish preparations which are the portions of breadcrumb-coated fish fillets and the fishcakes. Both types of preparation require the use of breadcrumbs, starch, or starch-containing substances or other ingredients.

It is the object of the Applicants to provide a fish preparation which is nearly exclusively based on fish, without any breadcrumbs, starch, starch- containing substances or gelling agents, although it may include ingredients destined to modify the taste, such as flavorings.

A fish preparation has already been proposed in document FR 2 559 649, which is of the paste type, and which contains no breadcrumbs, starch, starch-containing substances or gelling agents. However, the cohesion of such preparation is obtained by thermal coagulation since the preparation is subjected to a sterilization in an autoclave which cooks it.

Document FR 2 059 337 relates to a reconstituted meat preparation which can optionally be based on raw fish. The aim of this document is to provide a meat preparation which contains no connective tissue and which is composed of 30 to 97.5% by weight of a ground meat composition in which the meat has a mean granulometry of less than 2 mm and brings at least 1% by weight of all the meat proteins of the product and between 2.5 and 70% by weight of a constituent which confers the texture and consists of separated bundles of muscle fiber, each one of which has a length varying between 2 and 50 mm and a diameter between 0.5 and 2 mm, the bundles of muscle fiber being substantially parallel together for at least 70% of them and being closely dispersed in the minced meat composition to which they adhere. Thus, the reconstituted meat described in this prior document is more tender than normal meat since the connective tissue has been eliminated, yet it has substantially the same texture as normal meat. It is unquestionably a reconstituted meat.

In said document FR 2 059 337, it is indicated that the flesh involved may be not only be flesh from mammals but also from poultry, fish and shellfish. The example which illustrates the preparation based on fish provides to pass the pieces of cod fillets through a perforated plate in which the holes have a diameter of 1.5 mm in order to obtain a finely divided fish flesh which contains separated bundles of muscle fiber. The resultingly divided fish is then mixed with a polyphosphate and water in order to obtain a paste which is thereafter extruded to produce the preferential alignment of the bundles of muscle fiber. The extruded strip of fish is cut into pieces which are frozen, then coated with a batter suitable for making fishcakes, and then fried slightly and frozen again until consumption time.

It is specified that, when eaten, the reconstituted fishcakes have a texture and appearance similar to the fish cakes made from whole fish fillets.

SUMMARY OF THE INVENTION

The aim of the applicants is totally different from that of document FR 2 059 337. This object is not to reconstitute the texture and appearance of a whole fish fillet, but rather to provide a raw fish preparation, which is deep-frozen and free from any ingredients such as breadcrumbs, starch, starch-containing substances or gelling agents, and which is in any adapted form, with sufficient cohesion to be fried in a pan like a minced steak or even deep-fried or oven-baked, steamed or cooked in vacuo. Given that according to the Control Services on competition, consumption and frauds, the term "steak" is not reserved for beef meat, the Applicants' aim is to propose, by analogy therewith, a minced steak of raw deep-frozen fish.

This aim is definitely reached by the preparation according to the invention. Said preparation is a raw deep-frozen fish preparation, containing no gelling agent, starch, polyphosphate or substances other than salt or proteinic materials or other than ingredients adapted to modify the smoothness and the taste. In characteristic manner, said preparation is composed of between 90 and 75% of coarse pieces of fish, containing the connective tissue, and of between 10 and 25% of a fish paste, coated around the coarse pieces, said paste consisting of finely ground and minced fish capable of forming a binder, absolutely free of gelling agent; moreover, the preparation according to the invention contains substantially all the constituent water of both the pieces of fish and the fish paste.

On the one hand, the structure of the largest pieces differs from the structure of the pieces described in document FR 2 059 337 insofar as there are no separated bundles of muscle fiber but rather coarse pieces containing connective tissue. On the other hand, the proportions between the paste and the pieces also differ very substantially since the applicants have been able to establish that, considering the structure of the coarse pieces of fish, the proportion of 10 to 25% of paste is the optimum proportion: a proportion smaller than 10% would not give sufficient cohesion, while a proportion greater than 25% would confer to the preparation a very pronounced sticky feeling in the mouth.

Also, the fact that the preparation contains substantially all the constituent water of both the pieces of fish and the fish paste as well as the corresponding connective tissue, preserves all the gustatory properties and makes it possible to obtain a preparation which stands up to cooking in the same way as fish.

The coarse pieces of the preparation have dimensions comprised between 2 and 10 mm.

The fish preparation described in document JP-A-03 091 440 contains polyphosphates and uses as binding agent, surimi which is a minced fish flesh, compressed and rinsed, and completely destructured, hence free of the constituent water and corresponding connective tissue. In addition, the pieces are big, between 3 and 10 cm. Therefore, said preparation has not the composition and structure of that according to the invention.

Preferably, the coarse pieces of fish are produced from fillets whereas the fish paste is produced from minced fish flesh. The fillet is the rich part of the fish, the minced flesh comes from the scraps obtained during extraction of the fillets. Said minced flesh has lost the fibrous texture of the fish flesh, but this is not important when producing the paste, according to the invention, since it is first and foremost the proteins contained in the minced flesh that are wanted for binding the pieces of fish.

Advantageously, the fish from which the coarse pieces and the fish paste are obtained is white fish, namely fish with white flesh, such as for example hake, Alaska hake, fresh cod, or the like. This type of fish is preferred, not only because of its price but also because of the characteristics of its flesh which is perfectly suitable for the preparation according to the invention, other fish such as salmon or trout having a more greasy flesh.

The flavor of the preparation according to the invention can be varied by using different types of fish as starting material, such as for example by using mainly fish with white flesh and in a lesser proportion, salmon and/or shellfish.

It is also possible to add a very small proportion, such as for example between 0.1 and 1% by weight, of ingredients of flavoring or seasoning type intended for altering the flavor of the preparation, or else between 1 and 10% by weight of ingredients of the oil or fatty substance type in order to modify the smoothness.

It is another object of the invention to propose a production method which is especially intended for producing said preparation of deep-frozen raw fish.

Characteristically, the method consists in using as starting material blocks of frozen or deep-frozen fish flesh and in carrying out the following steps:

a) partial defrosting of the fish flesh in order to reach a temperature of –10° C. to –2° C., b) finely mincing a proportion of 10 to 25% of the thus partly defrosted flesh, optionally adding a small quantity of salt and/or proteinic substances, until a fine paste is obtained which is sticky to the touch, c) mincing coarsely the rest of the partly defrosted fish flesh until coarse pieces are obtained, d) incorporating the coarse pieces to the paste until a homogeneous mixture is obtained, e) molding the homogeneous mixture and deep-freezing.

The fact of working at a temperature of between –10° C. and –2° C. has many advantages. A first one is the energy saved in defrosting the starting blocks and in deep-freezing after molding. A second advantage resides in the fact that, at that temperature, and in particular at a temperature ranging between –5° C. and –2° C., the mincing can be performed in good conditions and, whether the mincing is fine or coarse, there is no loss of exudate. In fact, in all the mincing or grinding methods using a fish flesh defrosted at room temperature in particular, there is inevitably a partial elimination, by exudation, of the constituent water of the fish flesh. The loss of such exudate affects the gustatory properties and the nutrient value of the fish flesh. In the range of temperature of –10° C. to –2° C., the fish flesh is in a semi-defrosted paste condition, through which the water does not run, and which remains in a crystallized state.

Preferably, the fish flesh which is intended for producing the fish paste contains between 10 and 25% minced flesh, while the fish flesh which is intended for making up the coarse pieces contains between 40 and 80% fillet and between 10 and 35% minced flesh.

In this case, the mincing and incorporating steps (steps b, c and d) can be performed in the same chopping-mixing type installation, of which the working parameters are so adjusted as to obtain the result expected for each step. In particular, the step of incorporation of the coarse pieces until a homogeneous mixture is obtained can be split into two steps: the first step consisting in mixing the minced flesh which is naturally constituted of coarse pieces, with the fish paste until homogenization, the second step consisting in adding the fillets and in mincing so as to obtain, on the one hand, the formation of coarse pieces obtained from the fillets, and on the other hand, the homogeneous mixture with the paste of all the coarse pieces obtained from the minced flesh and from the fillets.

According to one particular embodiment of the method of the invention, the molding is performed by pushing the homogeneous mixture through a casing so that the frozen preparation in its casing can be cut into portions.

According to a variant embodiment, flesh from fresh fish is used as starting material, in addition to the pieces of frozen or deep-frozen fish flesh; in this case, during either one of the operations in which the fresh fish flesh is used, namely during the fine mincing, coarse mincing and incorporation, the temperature is kept within a range of –10° C. and –2° C., in particular by the addition of dry ice, thereby preventing the temperature from rising again, as this would be detrimental.

DESCRIPTION OF PREFERRED EMBODIMENTS

The invention will be more readily understood on reading the following description of examples of embodiments of a preparation of minced deep-frozen raw fish.

In one specific example, the starting material is white fish in the form of deep-frozen blocks, some being blocks of fish fillet and the others blocks of minced fish flesh.

The white fish or white flesh fish is for example hake, Alaska hake, fresh cod or the like.

Conventionally, the blocks of fillet or the blocks of finely minced flesh are stored in a refrigerating chamber under temperatures ranging between –30° C. and –25° C.

The preparation according to the invention is produced in a chopping- mixing type machine in which horizontal or preferably vertical cutters are driven in rotation at speeds that may vary within wide proportions, for example between 1500 and 3000 rpms, sometimes reaching even 8000 rpms. Such a machine is capable of producing either a fine mincing or a coarse mincing, or simply a mixture, depending on the time, speed and direction of rotation. By coarse mincing is meant a mincing giving coarse pieces of dimensions varying between 2 and 10 mm.

First of all, the frozen blocks of fillet and the frozen blocks of minced flesh are partly defrosted to a temperature varying between –5° C. and –2° C. to the core.

Partly defrosted blocks containing minced flesh in a proportion of 10 to 25% by weight of the final preparation are introduced into the machine which is then set into operation until a fine paste, sticky to the touch, is obtained. The machine operating conditions correspond to a fine mincing.

The pasty form of the resulting homogeneous mixture is due to partial solubilizing of the natural proteins of the fish flesh, caused by the presence of salt in said flesh.

If necessary, depending on the type of fish used, it is preferable to add, during such fine mincing operation, a certain quantity of salt, such as for example to obtain between 0.4 and 0.6% salt with respect to the final preparation. It is also possible to add, instead of the salt, proteinic substances, notably vegetable proteinic substances, which will make it possible to obtain said pasty form by solubilizing of the natural proteins of the fish flesh without altering the taste thereof.

It would of course be possible to produce this paste from partly defrosted blocks of fillet, but this would increase costs rather considerably insofar as the fillet is much more expensive than the minced flesh which is somehow a residue from the production of the fillet. The use of the fillet at this stage would not be of any particular interest since the actual aim is not the coarse structure of the flesh but rather the natural proteins of the fish flesh which are exactly the same in the minced flesh and in the fillet.

According to one particular embodiment, the proportion of paste was about 15% with respect to the weight of the final preparation.

According to the applicants, a proportion less than 10% would not give a good cohesion of the final preparation, whereas a proportion higher than 25% would, it is true, be technically feasible, but it would give to the preparation a sticky feel in the mouth.

Once such fine and sticky paste has been obtained, to the paste introduced into the cutting machine is added a complementary quantity of partly defrosted minced flesh, at a temperature ranging from −5° C. to −2° C., for example a proportion of 15 to 30% by weight with respect to the final preparation. The machine is operated through a few revolutions in order to obtain a quick homogenization effect. The purpose of this is to mix and to thoroughly homogenize the coarse pieces coming from the partly defrosted blocks of minced flesh with the fine particles of the sticky paste, which fine particles should surround the coarse pieces so as to bond them one to the other.

It is possible, at this stage in the preparation of the paste, to add ingredients intended for modifying the smoothness, such as oil or another fatty substance, or for modifying the final taste, such as flavoring or seasoning.

Then, the rest of the partly defrosted blocks of fillet is introduced into the machine which is then operated so as to perform a longer coarse mincing step followed by a homogenizing step. The proportion of fillet is for example between 70 and 55% by weight with respect to the final preparation.

Of course, the proportions of minced flesh and fillet which are given by way of example, have a bearing on the quality/price ratio of the preparation. The quality is directly proportional to the quantity of fillet while the price is directly proportional to the quantity of minced flesh. It is therefore important to find the best possible compromise between the good behavior of the final preparation during cooking, its behavior in the mouth and its cost price.

The homogeneous mixture which is extracted from the machine is thereafter, after optional intermediate storage, passed through a shaping machine to give it any desired shape, then it is deep-frozen, directly or after intermediate storage.

According to a variant embodiment, the homogeneous mixture coming out of the machine is pushed into an envelope, such as a casing, then its is deep-frozen before being cut into portions, optionally after storage.

It should be noted that, throughout the production method, the temperature of the fish flesh should be kept, in the condition in which it stands, between −10° C. and −2° C. This condition makes it possible to keep the constituent water of the fish flesh in a crystallized state, thus preventing the loss of said water by exudation. Such loss would be harmful both to the gustatory quality and to the nutrient value of the final preparation, since the exudate contains in particular natural proteins from the fish flesh. Also, said temperature comprised preferably between −5° C. and −2° C. enables the mechanical mincing work to be performed without any difficulty.

The example described above is carried out in one and the same chopping/mixing type machine. Yet it could have been carried out in a plurality of machines, each one of which is adapted to obtain the desired effect at each step of the method. In particular, the coarse mixing could be performed in an open base grinding mill and the mixing of the paste with the coarse pieces could be performed in a simple mixer.

The present invention is not limited to the embodiment described hereinabove by way of non-restricting example. In particular, to vary the flavor of the preparation, it should also be possible to replace part of the flesh from white fish with the flesh from other fish, such as salmon which has a more greasy flesh, or with shellfish flesh.

It would moreover be possible to use as starting material, blocks of fresh fish flesh, at least in partial substitution for the blocks of frozen or deep-frozen fish flesh. In this case, it would be possible, in particular, in order to keep the temperature within the range of −10° C. to −2° C., to add for example dry ice during the operations in which the fresh fish flesh is processed.

The preparation of frozen and minced raw fish which is the object of the present invention and which is, in particular, obtained with the methods described hereinabove, is completely free from gelling agent, starch, starch-containing substances, polyphosphate or other substances besides salt or proteinic substances. It is therefore a fish preparation which is virtually pure and which is composed of coarse non-calibrated pieces of fish, which pieces are non-orientated and still contain the connective tissue, in a proportion ranging between 75 and 90%, and of a fish paste which consists in finely minced and ground fish flesh, and which can form a binder, said fine and sticky paste representing between 10 and 25% by weight of the total preparation. It should be noted that said preparation contains substantially all the constituent water and all the connective tissue of the minced and ground fish, as well as the paste and of the coarse pieces.

Said preparation, having been preserved in the freezer by the user, can be prepared exactly like a minced steak of beef meat. It also has the distinctive feature of being able to be deep-fried, due to its special texture, without any risk of disintegrating during cooking, which could occur in particular if the coarse pieces were of larger size.

What is claimed is:

1. Method for producing a raw deep-frozen fish preparation containing no gelling agent, no starch, no starch-containing substances, no polyphosphate or no substances other than salt or proteinic materials or other than ingredients capable of modifying the smoothness and the taste of the preparation, wherein said method uses pieces of frozen or deep-frozen fish flesh as starting material, said method comprising the following steps:

a) partially defrosting the pieces of the fish flesh to reach a temperature of −10° C. to −2° C.

b) finely mincing 10 to 25% of the thus partially defrosted flesh and optionally adding a small quantity of salt and/or proteinic substances, until a fine fish paste is obtained which is sticky to the touch, c) mincing coarsely the rest of the partially defrosted fish flesh until coarse pieces are obtained, d) incorporating the coarse pieces with the fine paste until a homogeneous mixture is obtained, and e) molding the mixture and deep-freezing the molded mixture.

2. Method as claimed in claim 1, wherein the fine mincing step occurs in a chopping/mixing type installation, the coarse mincing step occurs in an open base grinding mill and the incorporation step occurs in a mixer.

3. Method as claimed in claim 1, wherein the fish flesh which is intended for producing the fish paste is based on minced flesh, while the fish flesh which is intended for making up the coarse pieces contains 50 to 80% fillets and 10 to 25% minced flesh.

4. Method as claimed in claim 3, wherein the fine and coarse mincing and incorporating steps b), c) and d) are performed in the same chopping/mixing installation wherein the operating parameters are so controlled as to obtain the expected result for each step, and wherein the incorporating step d) is performed by mixing the coarse minced flesh with the fish paste until homogenization is achieved.

5. Method as claimed in any of claims 1 to 4, wherein the molding is performed by pushing the homogeneous mixture into a casing so that the deep-frozen preparation contained in the casing can be cut into portions.

6. Method as claimed in claim 1, wherein some fresh fish flesh is also used as starting material in addition to the pieces of frozen or deep-frozen fish flesh, and wherein, when the fresh fish flesh is used, the temperature is kept within a range of −10° C. to −2° C. by adding dry ice throughout the fine mincing, coarse mincing and incorporating steps b), c), and d).

* * * * *